United States Patent [19]

Hed

[11] Patent Number: 5,300,487
[45] Date of Patent: Apr. 5, 1994

[54] NONSPECULAR REFLECTOR WITH DIFFUSELY REFLECTING SUPERCONDUCTOR AND PROTECTION COATING

[75] Inventor: Aharon Z. Hed, Nashua, N.H.

[73] Assignee: Troy Investments Inc., Nashua, N.H.

[21] Appl. No.: 292,469

[22] Filed: Dec. 30, 1988

[51] Int. Cl.$^5$ .................. H01L 39/00; B32B 3/00; G02B 5/08

[52] U.S. Cl. .................... 505/182; 505/702; 359/599; 359/615; 359/838; 359/883

[58] Field of Search ............ 350/600, 609, 610, 641, 350/642; 505/1, 701, 702; 430/24; 359/599, 615, 838, 883

[56] References Cited

U.S. PATENT DOCUMENTS

| | | | |
|---|---|---|---|
| 2,558,848 | 7/1951 | Harrison | 359/884 |
| 3,619,235 | 11/1971 | Furuuchi et al. | 350/1.7 |
| 3,643,176 | 2/1972 | Gregory et al. | 372/44 |
| 3,645,601 | 2/1972 | Doctoroff et al. | 359/360 |
| 3,661,686 | 5/1972 | Armstrong | 359/588 |
| 4,022,947 | 5/1977 | Grubb et al. | 350/1.7 |
| 4,337,997 | 7/1982 | Sadoune et al. | 350/641 |
| 4,431,269 | 2/1984 | Barnes, Jr. | 350/610 |
| 4,490,184 | 12/1984 | Forcht et al. | 359/884 |
| 4,643,518 | 2/1987 | Taniguchi | 350/1.6 |
| 4,764,003 | 8/1988 | Lake et al. | 350/610 |
| 4,804,915 | 2/1989 | Hoenig | 324/248 |
| 4,886,776 | 12/1989 | Early et al. | 350/610 |
| 4,918,049 | 4/1990 | Cohn et al. | 505/701 |
| 4,942,142 | 7/1990 | Itozaki et al. | 505/701 |
| 4,970,197 | 11/1990 | Shiota et al. | 505/701 |
| 5,015,619 | 5/1991 | Wang | 350/610 |
| 5,086,037 | 2/1992 | Hitotsuyanagi et al. | 505/1 |

*Primary Examiner*—Bruce Y. Arnold
*Assistant Examiner*—R. D. Shafer
*Attorney, Agent, or Firm*—Herbert Dubno

[57] ABSTRACT

A reflector has a body of a ceramic oxide superconductive material whose surface is treated to be diffusively reflective and is coated with diamond-like carbon or magnesium fluoride.

8 Claims, 1 Drawing Sheet

NONSPECULAR REFLECTOR WITH DIFFUSELY REFLECTING SUPERCONDUCTOR AND PROTECTION COATING

FIELD OF THE INVENTION

This invention relates to improved mirrors and other reflecting surfaces, incorporating superconducting surfaces and films.

BACKGROUND OF THE INVENTION

When specular reflection is desired, mirrors and other reflecting surfaces have been traditionally manufactured by coating a well-polished surface of glass or metal with a reflecting metal like gold, copper, silver or aluminum. In order to avoid deterioration with time, these highly polished surfaces are usually covered with protective coatings. In some unique applications, particularly when the absorption of the coating itself tends to degrade the reflection efficiency of the mirror, an extremely durable reflective layer of rhodium has been used as well. For reflection in some parts of the electromagnetic spectrum, highly reflective insulators like the titanates, zincates and zirconates have also been used. When non-specular, or diffuse, reflection was desired, the substrate was often purposely etched and then coated with the reflecting substance, chosen from the above mentioned reflectors. The etching provides the substrate with its dull appearance, and as a result nonspecular, or Lambertian reflection, occurs (a Lambertian optical source is characterized by the fact that the intensity of its illumination is equal in all directions).

One of the shortcomings of traditional mirrors and reflectors used in high energy density applications is that even the best of said mirrors, and/or reflectors, absorbs at least one percent of the incident light. This imposes limitations and restrictions on the application of traditional mirror technology, especially where multiple reflections are desired or when the reflected beams have extremely high energy density, as in laser technology.

The known superconductors have never been considered for mirror and other reflective applications, despite the fact that they have conductivities which are better than normal conductors such as gold, silver and copper. In classical superconductors, the high conductivity results from pairing of the charge carriers. This pairing involves a binding energy that, for most classical superconductors, is less than 3 milli-electronvolts. Thus, when electromagnetic radiation with wavelengths shorter than about 0.4 mm impinges on such classical superconductors, it is absorbed and decouples the paired charge carriers. For most optical applications, including the infrared wavelengths, superconductors with much higher pairing energies are needed in order to be able to reflect at much shorter wavelengths.

Until recently, it was believed that superconductivity above 23 K. (and band gaps in excess of 3 milli-electronvolts) was not possible. This belief was rooted in the theoretical work now named the BCS theory (Bardeen, Cooper and Schrieffer) which predicted such an upper limit. As a result, no research in the field of superconducting mirrors and reflectors has been known heretofore.

The temperature at which superconductivity occurs in a superconductor (in the absence of any external magnetic fields) is termed the critical temperature of that superconductor. In the early 1970's a number of theoretical proposals were presented, suggesting that the critical temperature for superconductivity could be increased (V. L. Ginzburg, Usp. Fiz. Nauk. 101, 185 (1970)), (D. Allender, J. Bray, J. Bardeen, Phys. Rev. B8, 4433 (1973)), but the lack of any discoveries of superconductivity above 23 K., solidified the belief that indeed this critical temperature could not be exceeded. A significant experimental breakthrough in high temperature superconductivity (critical temperatures in excess of 23 K.) was provided in November 1986 by Bednorz and Muller when they published a tentative disclosure of high temperature superconductivity (Georg Bednorz and Alex Muller, Z. Phys. B64, 189 (1986)). Rapid confirmation by others was soon obtained. For instance, a report cites a critical temperature above 30 K. for $La_{2-x} Ba_x CuO_{4-y}$, (H. Takagi, S. Uchida, K. Kitazawa, S. Tanaka, Jpn. J. Appl. Phys. 26, L123 (1987)) Confirmation of a critical temperature of 93 K. was reported by Chu for a yttrium-barium-copper oxide ceramic (M. K. WU, J. R. Ashburn, C. J. Tang, P. H. Hor, R. L. Meng, L. Gao, Z. J. Huang, Y. Q. Wang, and C. W. Chu, Phys. Rev. Lett. 58, Mar. 2, 1987, p. 908.) This material has since been called the 123 compound, and has served as a model for advanced research in the field.

During 1987 and 1988, a number of families of high temperature superconductors have been discovered, with confirmed critical temperatures all the way to 162 K. These materials are usually ceramics containing copper (whose apparent valence state appears to be trivalent), an alkaline earth metal (Ca, Sr, or Ba) and a rare earth including Yttrium. Most of these superconductors have shown some degree of anisotropy in their properties. Therefore, it was significant when a superconducting ceramic of cubic symmetry, having a critical temperature above 23 K. (specifically 30 K.) was discovered based on a complex oxide of Ba, K and Bi. This superconductor was the first high temperature superconductor which did not contain copper in its composition. The implication is that the occurrence of high temperature superconductivity may be more widespread than has been realized to date. In addition, amorphous high temperature superconductors have also been reported, based on the bismuth compounds in which some of the bismuth was replaced with lead. The critical temperatures and critical current of these amorphous superconductors are somewhat lower than those of their crystalline counterpart.

There are some scattered reports of superconductivity above 162 K. For instance, R. G. Kulkarui has reported that oxides having an approximate composition $0.5CaO \cdot 0.5ZnO \cdot Fe_2O_4$. become superconducting at about this temperature. Ogushi has also reported room temperature superconductivity in yet ill-defined niobium strontium lanthanum oxides. While these reports have yet to be confirmed independently by other researchers, it is reasonable to expect that superconductors with critical temperatures near to room temperature will soon be obtained, having electron pairing energies much higher than known heretofore.

In classical superconductors, the optical band gap has been found to be equal to the electronic band gap (as measured on a Josephson junction), and has values of about $3.5 kT_c$. However, in some of the high temperature superconductors, I have determined that the observed critical temperature and the "optical" critical temperature are not equal, and that the said optical critical temperature, which I have termed the "virtual critical temperature", can be much larger than the thermodynamic critical temperature. As a result, the optical band gap can be much higher than $3.5 kT_c$. I further find that fore wavelengths longer than their optical band gap, these superconductors can reflect electromagnetic radiation more efficiently than normal metals, and with smaller losses of reflected energy.

I have also determined that when the superconductors are quenched by chosen means into their normal state, they combine absorption, reflection and transmission of light at ratios that depends on the physical properties of their respective normal states. Thus, superconducting materials will be found that have charge carriers with virtual critical temperatures (pairing energies) in excess of 2 electron-volts. This makes possible mirrors capable of reflecting electromagnetic radiation in the infrared as well as in the visible part of the spectrum. This postulation is based not only on the classical scaling of the charge carriers' binding energy with temperatures of $3.5 kT_c$ which in themselves would be insufficient to reach the infrared range (unless critical temperatures in excess of 500 K. are achieved), but is based particularly on my discovery that the virtual critical temperature can be more than twice the thermodynamic critical temperature.

A further tenet of the instant invention is that some of these high temperature superconductors have the unique property of being insulators in their normal state, and basically transmit electromagnetic radiation (at least within a specific band that depends on the electronic state of the normal state in a manner well known in the art). To differentiate between the different classes of superconductors and clearly define classes that are suitable for the practice of this invention, I have classified superconductors according to the nature of their corresponding normal state. Classical BCS superconductors are usually metallic in their normal state. Therefore, they belong to a class that I have denoted as (SC,M), namely, that below and above their critical temperature a superconducting and a metal phase exists, respectively. A few examples of this class of superconductors are mercury, niobium and its A15 intermetallic compounds with tin and germanium.

The newer class of ceramic superconducting oxides, that are semimetals or semiconductor in their normal state, thus belong to a class that I have denoted as (SC,S) in a similar manner. Examples of superconductors belonging to this class are the 123 compounds and the bismuth-based oxide superconductors.

Finally, the last class of superconductors are insulators in their normal state and thus belong to a class that we denote, (SC,I). An example of this group is Kulkarui's superconducting spinel-like compound, having an approximate composition of $0.5CaO \cdot 0.5ZnO \cdot Fe_2O_4$.

I have determined that some superconductors belonging to the last two classes have virtual critical temperatures that are higher than the actual, or thermodynamic, critical temperature. I have further established that the differential is expected to be much larger for the superconducting oxides of the class (SC,I) with a normal insulating state. Thus, the present invention concerns only mirrors made with or of superconductors belonging to the (SC,S) class, wherein their normal state is that of a semiconductor, and/or the (SC,I) class, namely wherein their normal state is an insulator.

OBJECTS OF THE INVENTION

Therefore, it is an object of the present invention to provide new applications of ceramic high temperature superconducting materials as mirrors and reflectors.

Another object is to provide improved methods for forming mirrors and reflectors from suitable superconducting ceramic compounds.

Still another object is to provide superconducting mirrors which have higher reflectances and thus lower absorption losses.

Another object is to provide superconducting mirrors composed of a well-polished superconducting ceramic substrate.

A final object is to provide superconducting mirrors formed from the coating of a suitable superconducting ceramic layer onto a suitable substrate and the subsequent coating of said layer with an optically suitable covering to protect the superconductive mirror from interaction with the environment.

SUMMARY OF THE INVENTION

The instant invention discloses mirrors and reflectors made essentially from superconductors belonging to the classes (SC,S) and (SC,I) as defined herein, where the normal state of these superconductors can be either semiconducting (class (SC,S)) or can be an insulator (class (SC,I)). Said mirrors and reflectors possess reflectivities that are much higher than the best mirrors known heretofore, when the electromagnetic beam being used contains only wavelengths that are longer than the optical band gap of said superconductors. Said mirrors and reflectors of the new invention can be formed entirely from the said superconducting ceramics themselves or from a coating of said superconductors applied to a suitable substrate. The instant invention also discloses methods for protecting the superconducting mirror surfaces to prevent deterioration due to the environment. Unlike any other mirrors and reflectors, these mirrors and reflectors can be switched from their reflective state to a non-reflective state by quenching the superconductors to their normal state.

In the practice of this invention, superconducting oxides are prepared generally in one of two forms, as the bulk form and/or as a relatively thin layer deposited on an appropriate substrate. The high temperature superconducting compositions discovered to date have been prepared by heating certain oxides at elevated temperatures so as to obtain solid state reaction yielding the appropriate compound. One weighs out defined quantities of the selected oxides, or their precursors, or mixtures of oxides and precursors, to yield the appropriate stoichiometry cf the desired superconducting oxide after calcination and sintering. Some of the said precursors include the carbonates, or nitrates of the respective cations; in some cases organometallic salts can be used as well; these include the citrates and oxalates of the respective cations.

One can also create a mirror by processing the oxides directly into the final shape desired, or by first obtaining the superconducting compositions as powders and then sintering the desired mirror from said powders in a secondary high temperature heating step. I have found that the former case usually yields a better quality surface (after polishing), but if very fine superconducting particles are available, acceptable mirrors can be achieved by the latter method as well.

It is often required (particularly with 123 compounds) to reoxidize the surface of the resulting superconductor after consolidation, so as to reestablish the equivalent of the trivalent copper state. This can be achieved by annealing the surface in an oxygen-rich atmosphere at an appropriate temperature (which depends on the specific superconducting ceramic oxide used). I have found that it is even better to perform such annealing after the surface has been polished (in the case of mirrors).

When deposition of a superconducting layer on a substrate is desired, methods like plasma flame deposition (PFD), plasma deposition (PD) chemical vapor deposition (CVD), metallo-organic chemical vapor deposition (MOCVD) and laser ablation, are those well known in the prior art and can, with modifications, be used in the practice of my new invention. In most cases, particularly with plasma flame deposition and laser ablation, I have determined that post-deposition annealing and oxidation is required. Another method that I have found quite useful involves the precipitation of the mixed superconducting oxide precursors in thin layers from organic solutions, followed by pyrolysis and oxidation (either simultaneously or consecutively).

I have also found that the thickness of the superconducting layer must be maintained at a lower limit which is determined by the penetration depth of magnetic fields employed. This value, which for high temperature superconductors can be as large as one micron, is usually about a few thousand angstroms. There is no required upper limit on the thickness of the layer, and in the practice of the instant invention, the said upper limit is therefore determined by the specific application of the instant invention plus considerations of cost.

Since both the (SC,S) and (SC,I) classes of superconducting materials are metastable, surfaces are often obtained that in their virgin state do not stay superconducting. This occurs particularly in the presence of atmospheric contaminations (water vapor, carbon dioxide and other contaminants). For those superconducting mirrors and reflectors that are not stable to environmental interactions, I have found that one needs to create a composite mirror, consisting of a smooth superconducting surface obtained either by polishing a bulk superconductor or by depositing a superconductor on an appropriate substrate, followed by coating said surface with an appropriate transparent medium that will provide protection from the environment, and delay, or eliminate, interactions that would cause the metastable phases to revert to their more thermodynamically stable phases that are not superconducting. It should be clear that for such superconducting mirrors and reflectors made with superconducting substances that are immune to environmental attacks, or that are intended to operate in vacuum, or will not be exposed to environmental influence, the superconducting mirrors and reflectors of the instant invention will not require the coating of transparent and impermeable protective surfaces.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1A:
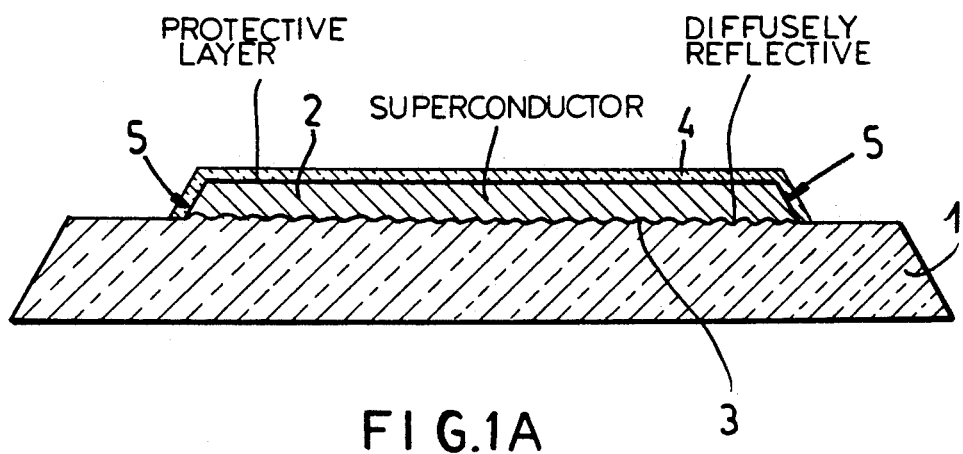
FIG. 1A is a cross sectional view of a planar superconducting mirror according to the invention.
Figure 1B:
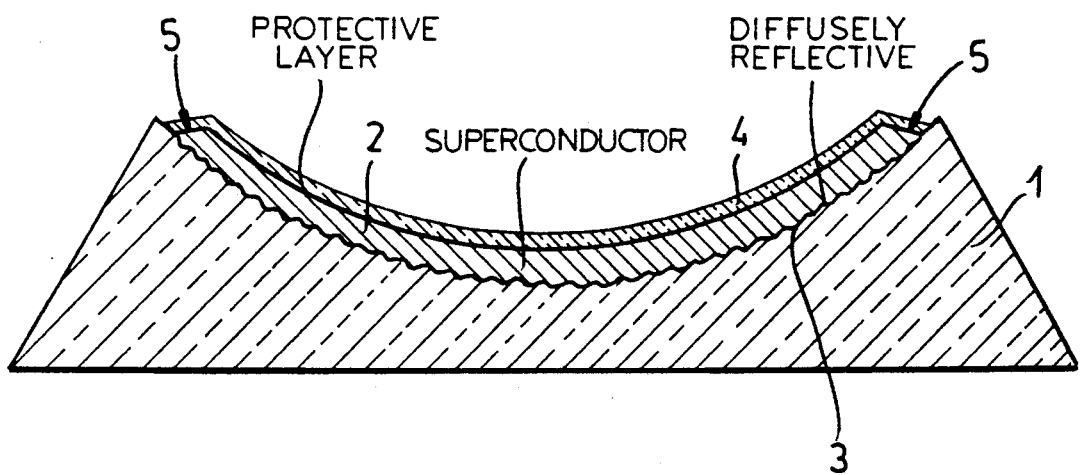
FIG. 1B is a cross sectional view of a curved superconducting mirror.

In FIG. 1A and FIG. 1B I show typical structures of superconducting mirrors. FIG. 1A depicts a typical cross section through a planar mirror, while FIG. 1B is that of a cross section through a spherical, cylindrical or any curvilinear mirror.

The substrate 1 is optional and can be eliminated if the superconducting material is prepared in bulk and one can preserve its shape and structural integrity. When a substrate is required, and specular reflection (mirror) is desired, the surface 3 of the substrate must be polished to a high degree of smoothness. If one desires a non-specular (diffuse) reflector, or a Lambertian reflector, then the surface 3 of the substrate must be dulled. The substrate can be an amorphous or appropriate crystalline substance. The only requirement is that the degree of interaction with the deposited superconductor be minimal at the maximum temperature required for manufacture.

As to the superconductor 2, it is possible to choose between a semiconducting and an insulating type of superconductor (defined in their respective normal states as superconductors belonging to either class (SC,S) or class (SC,I)) to be deposited on the substrate. If the deposited surface is smooth enough, this deposition can be directly followed by deposition of the protective transparent coating 4. Between these two steps, one may consider a number of surface treatments that will improve the reflectivity of the surface. These treatments depend strongly on the morphology and chemistry of the superconductive surface.

One may find that the surface as deposited is not smooth enough and chemical or mechanical polishing may be required. If this is done, an additional step prior to the deposition of the final impervious surface may be required as well. This step consists of reestablishing the superconducting phase at the surface. This will usually mean a re-annealing step in the appropriate atmosphere, usually oxygen. As a result of the deposition and potential post treatment, one can expect a thin interaction layer to be formed between the superconductor and the substrate. It is essential that this interaction layer should be kept as thin as possible. In addition, the thickness of the superconductor layer must exceed the penetration depth of magnetic fields.

The recommended outer impervious surface coatings 4 of this invention include a diamond like carbon surface which can be plasma deposited from, for instance, acetylene. The superconducting surface should be maintained at temperatures between 300° C. and 500° C. The lower temperature is dictated by the thermodynamics of diamond-like carbon thin film plasma deposition techniques, and the higher temperature to avoid destabilization of the superconductive phase.

I have further determined that another excellent coating is magnesium fluoride. This can be deposited by chemical vapor deposition or plasma deposition. The choice of coatings for the external surface of the instant invention must provide for the following properties:

A. An insulating (very large band gap) and transparent substance that does not easily interact with the superconductor.

B. A substance that provides a continuous diffusion barrier to contaminating species.

C. A substance with minimal optical absorption in the spectrum range for which the mirror is intended.

Both magnesium fluoride and diamond-like carbon films have the appropriate properties. Magnesium fluoride can be deposited at lower temperatures than diamond-like carbon; however, the imperviousness of diamond-like carbon films is far superior.

I have demonstrated that the diamond-like carbon and/or magnesium fluoride films are to be deposited over the edges 5 of the superconducting layer to assure a complete seal of the superconducting layer from the environment. The resulting surface then becomes a virtually zero loss reflector for the optical range intended (wavelengths longer than the equivalent binding energy of the charge carriers). The only optical losses at temperatures below the critical temperature of the superconducting mirror result from the minimal absorption of the protective layer. This absorption will be a function of the purity of the protective outer coating and its thickness. I have also determined that oxide protective layers like magnesium oxide and aluminum oxide are somewhat less appropriate than fluorides and diamond-like carbon. This apparently is due to the formation of an excessive interaction layer between the superconductor oxide and the protective oxide. I have further determined that when more optical absorption in the transparent impervious layer is acceptable for a given mirror application, other coatings well known in the prior art can be used as well. These include some of the polycarbonates, polyacrylates and other transparent organic films that are impervious to gas diffusion.

The shapes of mirrors that can be embodied in the present invention include, but are not limited to, both convex and concave configurations, plus closed and open reflectors. Mirror shapes also include the inside or the outside of appropriate geometrical surfaces, and reflecting surfaces which are planar, curved or curvilinear.

I have demonstrated that the application of such mirrors is extremely broad. Said applications include not only specific uses as laser mirrors but also switchable mirrors useful in optical memory drives and optical communications.

EXAMPLES

1. To prepare a superconducting mirror, one selects a well-polished glass form. This form can be a concave reflector, for example. The glass form is placed within a suitable apparatus so as to deposit a thin film of a selected superconducting compound. The method of deposition can be either chemical vapor deposition, evaporation by laser and/or electron beam heating, or by plasma discharge, as is known in the art. The film thickness is carefully controlled, and depends upon the nature of the superconducting film being deposited. After the said film has been deposited and reoxidized (as required), an overcoating such as magnesium fluoride is deposited according to methods of the prior art and the mirror is ready for use. Said mirrors of the instant invention are useful, for example, when a laser beam of an appropriate wavelength which is longer that the optical band gap of the said superconducting layer, needs to be reflected with minimal losses and minimal absorption in the reflecting mirror itself.

2. A selected superconductor composition is hot-pressed to form a desired shape. The surface that will serve as a reflecting mirror is then polished, using known methods to form a highly lustrous surface. A suitable overcoating is then applied, as in Example 1, but not limited thereto, and the finished superconducting ceramic mirror is ready to be used in its intended application. Said application could be the modulation of electromagnetic radiation with wavelengths longer than the optical band gap of the superconducting mirror. Said modulation can take the form of turning the mirror on and off from the reflective to the non reflective mode by quenching the superconductor to its normal state when the off-state is desired.

3. The methods of Examples 1 and 2 can be used to form a Lambertian reflector, except that the surface of the reflector is not polished prior to overcoating with a protective layer. When the virgin surface is too smooth, and the resulting mirror is expected to have a specular component for reflected light higher than desired, one can treat the surface to be diffusively reflective by techniques such as, but not limited to, etching, sand blasting and shot peening to form an uneven surface on either the substrate (in the case of a deposited superconductor layer), or on the superconducting surface itself. In the case of etching, reoxidation of the surface of the superconductor is usually required following the etching step.

4. The methods of Examples 1, 2 and 3 can be used to form a number of geometrical configurations. The final shape chosen depends primarily upon the end-use contemplated. For example, the following can be selected:

a. A reflecting surface with the shape of the inner corner or the outer corner of a cube.

b. A reflecting surface having a cylindrical shape or any segment thereof with a circular cross section.

c. A reflecting surface having a curved cross section including, but not limited to, a parabola, an ellipse or any geometrical line of the second or higher order.

d. A reflecting surface having a cylindrical shape or any segment thereof with a cross section formed by a polygon.

It is understood that the above described embodiments of the invention are illustrative only, and modifications and alterations thereof may be made by those skilled in the art. Accordingly, it is understood that this invention shall not be limited to the embodiments disclosed herein but is to be limited only by the appended claims.

SPECIFIC EXAMPLE

A specific example of the structure and manufacturing technique of a mirror of the instant invention follows.

The system used in the manufacture of the mirror of this invention is a simple "Bell Jar" type vacuum system, equipped with a magnetically enhanced radio frequency triode plasma sputtering system and a DC plasma generator.

The bell jar is also equipped with a movable substrate table that can be independently heated and rotated within the bell jar so as to move it in line sequentially with the rf plasma sputtering system and the DC plasma system. A second rotating arm with can position a movable quartz screen between the rf sputtering source and the table. The quartz screen is about 1.25 inch in diameter and 0.5 mm thick shape like a ring with an inner diameter of 12 mm.

The bell jar is connected to two independently controllable gas entry leakthrough needle valves and a powerful vacuum system capable of reaching a vacuum under a millitorr within 10 seconds, when starting at about 2 to 5 torr pressure.

The first entry leakthrough valve is connected to a source of Argon and delta singlet oxygen (which itself always contain some regular molecular oxygen), whose ratio of flows can be independently controlled to about 2% of total flow.

The second entry leakthrough valve is connected to a source of acetylene and ethane at a fixed ratio of 95 parts acetylene and 5 parts ethane.

The target from which the superconductor is sputtered onto the substrate, consists of a small disk one inch in diameter and about ⅛ of an inch thick of pre pressed oxides. This target is prepared in the following manner: a mixtures of 112.9 grams of $Y_2O_3$, 394.68 grams of $BaCO_3$ and 268.62 grams of CuO is mixed in a mortar with a pestel until well mixed (about five minutes). An Inconel die with a loose Inconel bottom of about 1.25 inch in inner diameter is filled with the mixture and an Inconel plunger is fit inside the die to cover the powder. The covered die is then positioned in a tubular furnace preheated to 925° C. on a support and pressure of about 7500 psi is applied to the plunger. After about 15 minutes, the die is removed from the furnace and the pellet of mixed oxides forced out by pressing on one of the two plungers. The pellet is allowed to cool to room temperature. The pellet is then cored to about 1 inch diameter with an ultrasonic coring machine, using kerosene as the abrasive carrier. Slices of about ⅛ inch thickness are cut from the pellet with a diamond saw in kerosene as a cooling medium. The pellet itself is no superconducting, nor, apparently, are the powders well reacted to form a completely homogeneous mixed oxide. The pellet is however quite dense (about 5% percent porosity), and is easily handled without excessive friability.

As a substrate we use a well polished single crystal of strontium titanate $SrTiO_3$. The orientation of the deposition surface is in the 100 plane.

At the beginning of the process the substrate is positioned on the substrate table and the target is positioned in the appropriate target holder in the magnetically enhanced rf triode plasma sputter device.

The bell jar is evacuated to about 0.01 millitorr or better and the substrate is brought to about 425° C. A mixture of about 10% delta singlet oxygen (about 60% pure the balance being molecular oxygen) in 90% argon is allowed to leak through and bring the pressure back to about 10 millitorr. The substrate table is already at the position under the rf sputtering source with the ring like quartz screen above (about 1 mm apart) the strontium titanate substrate. The sputtering is initiated and continued for about 30 minutes. Once this step is completed, the rf source is turned off and simultaneously the argon source is cut off while the pump is activated for about a minute. When the pump is turned off again the pressure is allowed to reach about 2 to 5 torr of delta singlet oxygen. The temperature of the substrate is increased to about 600° C. and complete oxidation of the first superconducting layer occur. This layer is about 3000 angstrom thick and about 12 mm in diameter.

Without breaking the vacuum, the table is slowly turned around and allowed to be positioned under the Dc plasma while the pressure is reduced back to about 10 millitorr. Once the table has come to rest the DC plasma is activated at about 2 kilovolt for about 10 seconds.

the temperature of the substrate is allowed to decrease back to about 425° C. and then the pressure is once again reduced to about 0.01 millitorr. While the pump is still evacuating the system, a leak from the second leakthrough valve is allowed thus introducing in the system a mixture of acetylene and ethane (95% to 5% in volume). The pump is stopped and the mixture is allowed to build to a pressure of about 1 millitorr. The DC plasma is again activated and diamond like carbon is deposited on the whole surface covering completely including the superconducting disk. Once the diamond like carbon layer has reached about 1000 angstrom the plasma is disconnected. We now let the table cool off to room temperature and break the vacuum on the bell jar, and retrieve the mirror.

I claim:

1. A reflector comprising a body of a ceramic oxide superconductive material which is superconductive at a temperature below a critical temperature and which is semiconductive or insulating at a temperature above said critical temperature, said critical temperature being a temperature above which said body is not superconducting and below which said body is superconducting, said body having a surface of said ceramic oxide superconductive material treated to be diffusely reflective and adapted to be disposed in a path of electromagnetic radiation to be reflected and of a wavelength longer than an optical binding energy of paired charge carriers of the superconductive ceramic oxide material and a protective coating of diamond-like carbon or magnesium fluoride on said body in said path.

2. The reflector defined in claim 1 wherein said body is a layer having a thickness greater than the electromagnetic field penetration depth of said superconductive ceramic oxide material and deposited upon a substrate.

3. The reflector defined in claim 2 wherein said substrate has a dulled surface upon which said layer of superconductive ceramic oxide material is deposited.

4. The reflector defined in claim 1 wherein said coating is diamond-like carbon.

5. The reflector defined in claim 1 wherein said surface is planar.

6. The reflector defined in claim 5 wherein said surface defines one reflective surface of a group of planar surfaces defining a corner of a cube.

7. The reflector defined in claim 1 wherein said surface is a curved surface.

8. The reflector defined in claim 7 wherein said surface forms at least a segment of a surface of revolution.

* * * * *